(12) United States Patent
Larsson et al.

(10) Patent No.: US 11,093,090 B2
(45) Date of Patent: Aug. 17, 2021

(54) TFT-BASED FINGERPRINT SENSING SYSTEM WITH CORRECTED READ-OUT

(71) Applicant: Fingerprint Cards AB, Gothenburg (SE)

(72) Inventors: Andreas Larsson, Herrljunga (SE); Frank Riedijk, Delft (NL)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 16/983,788

(22) Filed: Aug. 3, 2020

(65) Prior Publication Data

US 2021/0173501 A1 Jun. 10, 2021

(30) Foreign Application Priority Data

Dec. 6, 2019 (SE) .................................... 1951406-6

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0418* (2013.01); *G06F 3/04166* (2019.05);
(Continued)

(58) Field of Classification Search
CPC .... G06F 3/044; G06F 3/04166; G06F 3/0418; G06F 21/32; G06K 9/00013; G11C 11/419
See application file for complete search history.

(56) References Cited

U.S. PATENT DOCUMENTS

2004/0183752 A1 9/2004 Kawasaki et al.
2014/0352440 A1 12/2014 Fennell et al.
(Continued)

FOREIGN PATENT DOCUMENTS

| WO | 2005031636 A1 | 4/2005 |
| WO | 2017052836 A1 | 3/2017 |
| WO | 2019037098 A1 | 2/2019 |

OTHER PUBLICATIONS

Swedish Search Report dated Jun. 8, 2020 for Swedish Application No. 1951406-6, 3 pages.

*Primary Examiner* — Yaron Cohen
(74) *Attorney, Agent, or Firm* — RMCK Law Group, PLC

(57) ABSTRACT

A fingerprint sensing system comprising a plurality of conductive selection lines; a plurality of conductive read-out lines crossing the selection lines; selection circuitry controllable to provide a selection signal on at least one selected selection line in the plurality of selection lines; a plurality of pixel elements formed at intersections between the selection lines and the read-out lines; a reference signal source configured to provide a reference signal; and read-out circuitry coupled to each read-out line in the plurality of read-out lines and to the reference signal source, the read-out circuitry being configured to acquire a read-out signal via a read-out line connected to a selected pixel element, when the selected pixel element provides the sensing signal; acquire a reference signal from the reference signal source; form a corrected read-out signal for the selected pixel element based on the read-out signal and the reference signal; and provide corrected read-out signals.

16 Claims, 11 Drawing Sheets

(51) Int. Cl.
    *G11C 11/419*    (2006.01)
    *G06K 9/00*      (2006.01)
    *G06F 21/32*     (2013.01)

(52) U.S. Cl.
    CPC ......... *G06F 21/32* (2013.01); *G06K 9/00013* (2013.01); *G11C 11/419* (2013.01)

(56) References Cited

U.S. PATENT DOCUMENTS

| | | |
|---|---|---|
| 2015/0015515 A1 | 1/2015 | Dickinson et al. |
| 2017/0006245 A1 | 1/2017 | Fomani et al. |
| 2018/0004320 A1* | 1/2018 | Polishchuk ......... G06F 3/04166 |
| 2018/0046836 A1 | 2/2018 | Hinger |
| 2018/0101271 A1 | 4/2018 | Tsai et al. |
| 2019/0009302 A1 | 1/2019 | Zheng |
| 2019/0101437 A1 | 4/2019 | Miranto et al. |
| 2020/0012833 A1* | 1/2020 | Jin ....................... G06K 9/0004 |

* cited by examiner

TFT-BASED FINGERPRINT SENSING SYSTEM WITH CORRECTED READ-OUT

CROSS-REFERENCE TO RELATED APPLICATIONS

This application claims priority to Swedish Patent Application No. 1951406-6, filed on Dec. 6, 2019. The disclosure of the above application is hereby incorporated by reference in its entirety.

FIELD OF THE INVENTION

The present invention relates to a fingerprint sensing system for sensing a finger surface of a finger, comprising a plurality of conductive selection lines arranged in parallel to each other; a plurality of conductive read-out lines arranged in parallel to each other and crossing the selection lines; selection circuitry coupled to each selection line in the plurality of selection lines, and controllable to provide a selection signal on at least one selected selection line in the plurality of selection lines; and a plurality of pixel elements, each being formed at a respective intersection between a selection line in the plurality of selection lines and a read-out line in the plurality of read-out lines.

BACKGROUND OF THE INVENTION

Fingerprint sensing systems are widely used as means for increasing the convenience and security of electronic devices, such as mobile phones etc. In various electronic devices having a display, it may be desirable to provide for fingerprint sensing within the area occupied by the display. It may also be desirable to provide for fingerprint sensing across a relatively large area of the display.

A suitable configuration for a fingerprint sensing system for this application may be a fingerprint system having a configuration with a plurality of conductive selection lines arranged in parallel to each other; a plurality of conductive read-out lines arranged in parallel to each other and crossing the selection lines; selection circuitry coupled to each selection line in the plurality of selection lines, and controllable to provide a selection signal on at least one selected selection line in the plurality of selection lines; and a plurality of pixel elements, each being formed at a respective intersection between a selection line in the plurality of selection lines and a read-out line in the plurality of read-out lines.

This sensor configuration can be at least partly realized using relatively cost-efficient materials and technologies, such as TFT (thin film transistor) technology on a glass or plastic substrate.

Due to the relatively weak signals often involved in fingerprint sensing, it would be desirable to improve the quality of the signals provided by the fingerprint sensing system.

SUMMARY

It is an object of the present invention to provide an improved fingerprint sensing system, in particular a fingerprint sensing system providing an improved signal quality.

According to the present invention, it is therefore provided a fingerprint sensing system for sensing a finger surface of a finger, comprising: a plurality of conductive selection lines arranged parallel to each other; a plurality of conductive read-out lines arranged parallel to each other and crossing the selection lines; selection circuitry coupled to each selection line in the plurality of selection lines, and controllable to provide a selection signal on at least one selected selection line in the plurality of selection lines; a plurality of pixel elements, each being formed at a respective intersection between a selection line in the plurality of selection lines and a read-out line in the plurality of read-out lines, each pixel element in the plurality of pixel elements comprising: a sensing element responsive to a property indicative of a distance between the sensing element and the finger surface to provide an output indicating a sensed value of the property; and a sensing signal providing element coupled to the sensing element, the selection line and the read-out line, the sensing signal providing element being configured to provide to the read-out line, in response to the selection signal being provided on the selection line, a sensing signal being dependent on the output provided by the sensing element; a reference signal source configured to provide a reference signal; and read-out circuitry coupled to each read-out line in the plurality of read-out lines and to the reference signal source, the read-out circuitry being configured to: acquire a read-out signal via a read-out line connected to a selected pixel element, when the selected pixel element provides the sensing signal; acquire a reference signal from the reference signal source; form a corrected read-out signal for the selected pixel element based on the read-out signal and the reference signal; and provide corrected read-out signals for each pixel element in the plurality of pixel elements, wherein the fingerprint sensing system comprises: a TFT module including at least the selection lines, the read-out lines, and the pixel elements; and an ASIC coupled to the TFT-module, the ASIC including at least a portion of the read-out circuitry.

The sensing element may be responsive to a physical property that differs in dependence on the topography of the finger surface. Examples of such physical properties include capacitive coupling, mechanical coupling, thermal coupling, and optical reflection. As is well known to those of ordinary skill in the art, various sensing element configurations exist, that are suitable for sensing these physical properties indicative of the interaction between the finger and the sensing element. In the case of capacitive coupling, the sensing element may, for example, include a conductive plate where charge can be accumulated; in the case of mechanical coupling, the sensing element may, for example, have piezoelectric properties; in the case of thermal coupling, the sensing element may, for example, include a resistor or other circuit element that can be controlled to generate heat; and in the case of optical reflection, the sensing element may, for example, include a photo-diode that generates a photocurrent indicative of an amount of incident light.

The sensing signal providing element may be any element that can be selected, and, in response to being selected, can provide a sensing signal that depends on the output provided by the above-mentioned sensing element. As will be understood by one of ordinary skill in the art, the sensing signal providing element may have various configurations, including but not limited to switching circuitry controllable to connect an output of the sensing element to the readout line, and signal conversion circuitry controllable to convert the output of the sensing element to a sensing signal and to provide the sensing signal to the read-out line. The sensing signal providing circuitry may comprise at least one transistor, and the sensing signal may be provided to the read-out line as a voltage or a current.

The present invention is based on the realization that large area fingerprint sensing systems, in particular if they are implemented using technology selected for cost-efficiency, may exhibit relatively large variations in output signals that are not related to the topography of the finger surface that is to be sensed. Such variations may, for example, be due to signal interference and/or temperature dependent properties of the circuitry comprised in the fingerprint sensing system. The present inventors have further realized that at least some of such variations can conveniently be addressed by providing the fingerprint sensing system with a reference signal source configured to provide a reference signal, and using the reference signal as a basis for modifying signals acquired from the pixel elements via the read-out lines.

By using the reference signal from the reference signal source as a basis for forming corrected read-out signals in the read-out circuitry comprised in the fingerprint sensing system, it may be possible to avoid or at least reduce the occurrence of saturation in the read-out circuitry. As a consequence, the signal-to-noise ratio of the fingerprint sensing system can be increased and/or the useable temperature range of the fingerprint sensing system can be expanded.

The fingerprint sensing system according to embodiments of the present invention may advantageously be implemented using TFT-technology, providing for a cost-efficient fingerprint sensing system exhibiting a large sensing area.

For improved performance, some functionality of the fingerprint sensing system may be provided using CMOS technology, advantageously in the form of an ASIC coupled to a TFT-module including at least the selection lines, the read-out lines, and the pixel elements. In particular, at least a portion of the read-out circuitry may be comprised in a CMOS-component, such as an ASIC, which may provide the advantage of more compact circuitry with more well-controlled and less temperature-sensitive properties.

The reference signal source may be configured to provide the reference signal adaptively depending on at least one operating condition for the fingerprint sensing system. For instance, the reference signal may be temperature dependent.

In various embodiments, the reference signal source may be feedback controlled to adjust the reference signal depending on the corrected read-out signal.

In these or other embodiments, the reference signal source may include at least one reference element comprising circuitry having a similar dependence on operating conditions as the circuitry comprised in the pixel elements.

According to various embodiments, the sensing signal providing element comprised in each pixel element in the plurality of pixel elements may include semiconductor circuitry exhibiting a leakage current with a first temperature dependence, in the absence of the selection signal on the selection line coupled to the sensing signal providing element; and the at least one reference element may include semiconductor circuitry exhibiting a leakage current with a second temperature dependence.

In embodiments, the second temperature dependence may be substantially the same as the first temperature dependence. Typically, the leakage current increases with increasing temperature.

According to embodiments, the sensing element comprised in each pixel element in the plurality of pixel elements may be responsive to an amount of light incident on the sensing element to provide an output indicating a sensed value of the amount of light; the at least one reference element may comprise: a reference sensing element responsive to an amount of light incident on the reference sensing element to provide an output indicating a sensed value of the amount of light; and a reference signal providing element coupled to the reference sensing element and the read-out circuitry, the reference signal providing element being configured to provide to the read-out circuitry a reference sensing signal being dependent on the output provided by the reference sensing element; and the fingerprint sensing system may further comprise an opaque shielding structure arranged to prevent light from reaching the reference sensing element of the at least one reference element.

According to various embodiments, furthermore, the sensing signal providing element comprised in each pixel element in the plurality of pixel elements may be additionally coupled to a first driving voltage source; and the fingerprint sensing system may comprise a plurality of reference elements, each reference element in the plurality of reference elements being coupled to a second driving voltage source and to the read-out circuitry.

According to embodiments, the fingerprint sensing system may comprise a conductive reference line; the read-out circuitry may be coupled to the reference signal source via the reference line; the sensing signal providing element comprised in each pixel element in the plurality of pixel elements may be configured to provide the sensing signal in the form of a sensing current; and the read-out circuitry may be configured to: receive a read-out current on the read-out line connected to the selected pixel element; receive a reference current on the reference line; and subtract the reference current from the read-out current, resulting in a corrected read-out current.

According to some embodiments, the reference signal may advantageously include a component being indicative of a combined leakage current from the plurality of reference elements.

The fingerprint sensing system according to embodiments of the present invention may be included in an electronic device further comprising processing circuitry coupled to the fingerprint sensing system, and configured to perform an authentication based on the corrected read-out signals provided by the read-out circuitry of the fingerprint sensing system.

In summary, the present invention thus relates to a fingerprint sensing system comprising a plurality of conductive selection lines; a plurality of conductive read-out lines crossing the selection lines; selection circuitry controllable to provide a selection signal on at least one selected selection line in the plurality of selection lines; a plurality of pixel elements formed at intersections between the selection lines and the read-out lines; a reference signal source configured to provide a reference signal; and read-out circuitry coupled to each read-out line in the plurality of read-out lines and to the reference signal source, the read-out circuitry being configured to acquire a read-out signal via a read-out line connected to a selected pixel element, when the selected pixel element provides the sensing signal; acquire a reference signal from the reference signal source; form a corrected read-out signal for the selected pixel element based on the read-out signal and the reference signal; and provide corrected read-out signals.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE

Embodiments In the present detailed description, various embodiments of the fingerprint sensing system according to the present invention are mainly described with reference to a fingerprint sensing system in which the sensing elements are light-sensitive pixel elements, capable of sensing differences in the amount of light hitting the different pixel elements. Furthermore, the fingerprint sensing system is mainly described as being arranged under a display panel. However, this should not be construed as limiting the present invention, as defined by the claims. According to embodiments, other types of pixel elements may be used, that may be responsive to other properties than light. Furthermore, the fingerprint sensing system need not be arranged under a display panel, but may be used in other configurations, such as under a cover glass plate or over a display panel etc.

Figure 1:
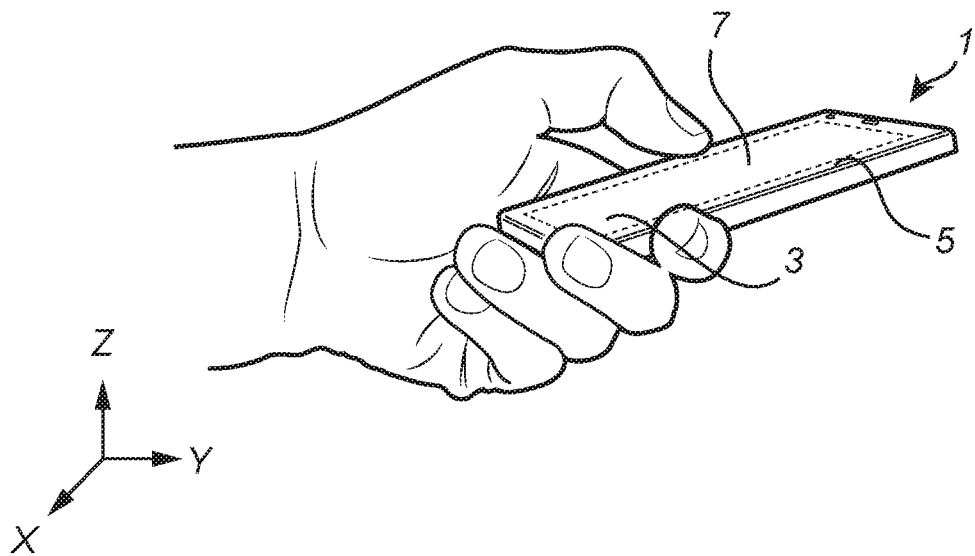
FIG. 1 is an illustration of an exemplary electronic device comprising a fingerprint sensing system according to an embodiment of the present invention, in the form of a mobile phone.

Turning now to the drawings and in particular to FIG. 1, there is schematically illustrated an example of an electronic device 1 configured to apply the concept according to the present disclosure, in the form of a mobile device with an integrated in-display fingerprint sensing system 3 and a display panel 5 with a touch screen interface 7. The fingerprint sensing system 3 may, for example, be used for unlocking the mobile device 1 and/or for authorizing transactions carried out using the mobile device 1, etc.

The fingerprint sensing system 3 is here shown to be smaller than the display panel 5, but still relatively large, e.g. a large area implementation. In another advantageous implementation the fingerprint sensing system 3 may be the same size as the display panel 5, i.e. a full display solution. Thus, in such case the user may place his/her finger anywhere on the display panel for biometric authentication. The fingerprint sensing system 3 may in other possible implementations be smaller than the depicted fingerprint sensing system, such as providing a hot-zone implementation.

Preferably and as is apparent to the skilled person, the mobile device 1 shown in FIG. 1 may further comprise a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to other types of electronic devices, such as smart watches, laptops, tablet computers, etc.

Figure 2:
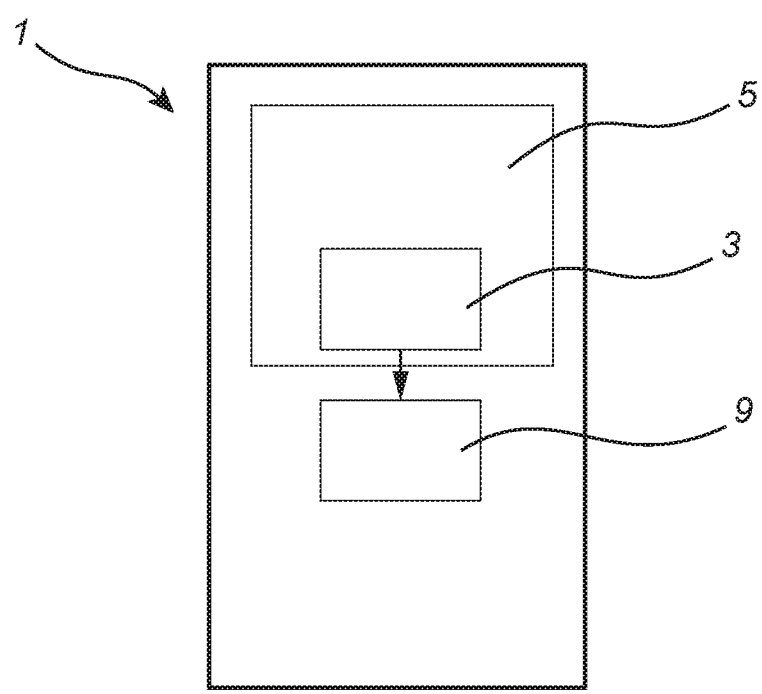
FIG. 2 is a schematic block diagram of the electronic device in FIG. 1.

FIG. 2 is a schematic block diagram of the electronic device 1 in FIG. 1. The electronic device 1 comprises a transparent display panel 5 and a fingerprint sensing system 3 conceptually illustrated to be arranged under the transparent display panel 5. Furthermore, the electronic device 1 comprises processing circuitry such as control unit 9 coupled to the fingerprint sensing system 3, and configured to perform an authentication based on read-out signals provided by the fingerprint sensing system 3. The control unit 9 may be stand-alone control unit of the electronic device 9, e.g. a device controller. Alternatively, the control unit 9 may be comprised in the fingerprint sensing system 3.

Figure 3:
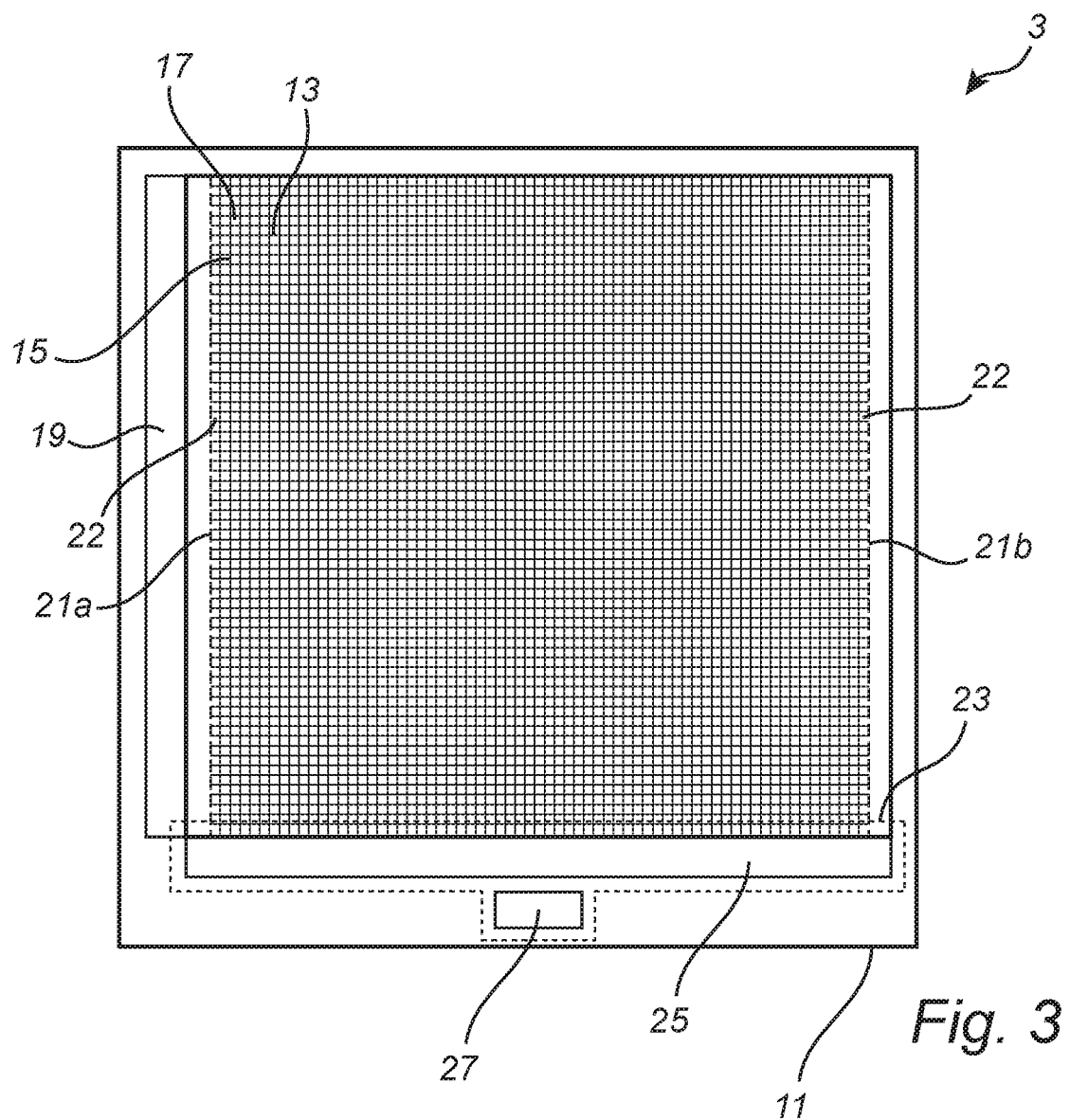
FIG. 3 schematically illustrates a fingerprint sensing system according to a first example embodiment of the present invention.

A fingerprint sensing system 3 according to a first example embodiment of the present invention will now be described with reference to FIG. 3. As is schematically indicated in FIG. 3, the fingerprint sensing system 3 comprises structures formed on a substrate or carrier 11. In particular in embodiments where the fingerprint sensing system 3 is primarily manufactured using TFT-techniques, which are per se known to those skilled in the art, the carrier 11 may advantageously be made of glass or plastic. On the substrate 11 are formed a plurality of conductive selection lines 13 and a plurality of conductive read-out lines 15. The selection lines 13 are arranged in parallel to each other, and the read-out lines 15 are arranged in parallel to each other and crossing the selection lines 13. The selection lines 13 are conductively separated from the read-out lines 15, typically by a dielectric layer deposited between a first conductive layer including the selection lines 13 and a second conductive layer including the read-out lines 15. A plurality of pixel elements 17, here forming a pixel element array, are formed at respective intersections between the selection lines 13 and the read-out lines 15. In addition to the selection lines 13 and the read-out lines 15, the fingerprint sensing system 3 according to the first example embodiment in FIG. 3 comprises selection circuitry 19 coupled to each of the selection lines 13, first 21a and second 21b reference lines, and read-out circuitry 23 coupled to each read-out line 15 and to the reference lines 21a-b. Each of the reference lines 21a-b has a plurality of reference elements 22 connected thereto. In FIG. 3, only one reference element 22 per reference line 21a-b is indicated by a reference numeral. It should, however, be understood that there are typically many reference elements 22 connected to each reference line 21a-b. For example, the number of reference elements 22 along a reference line 21a-b may be in the same order of magnitude as the number of pixel elements 17 along a read-out line 15. Advantageously, the number of reference elements 22 along a reference line 21a-b may be higher than 50% of the number of pixel elements 17 along a read-out line 15. In the example configuration of FIG. 3, the functionality of the read-out circuitry 23 is partly provided by a portion 25 of the TFT-module, and partly by an ASIC 27 coupled to the TFT-module. In the example configuration in FIG. 3, the fingerprint sensing system 3 is shown to comprise two reference lines 21a-b parallel to the read-out lines 15 and closest to the edges of the fingerprint sensing system 3. It should be noted that the fingerprint sensing system 3 according to embodiments of the invention may comprise only one reference line, preferably closer to an edge of the fingerprint sensing system 3 than the read-out lines 15, or additional reference lines.

Various functional elements of the fingerprint sensing system in FIG. 3 will now be described with reference to FIGS. 4A-C.

Figure 4A:
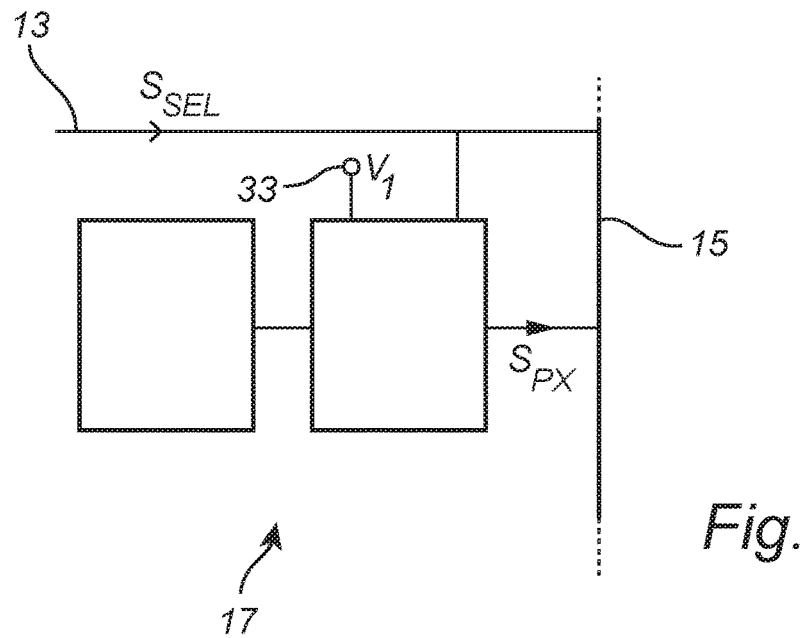
FIG. 4A is a schematic illustration of a pixel element comprised in the fingerprint sensing system in FIG. 3.

FIG. 4A is a schematic illustration of a pixel element 17 comprised in the fingerprint sensing system 3 in FIG. 3. Referring to FIG. 4A, the pixel element 17 comprises a sensing element 29 and a sensing signal providing element 31. As was discussed in the Summary section further above, the sensing element 29 is responsive to a property indicative of a distance between the sensing element 29 and the finger surface, to provide an output indicating a sensed value of the property. In the exemplary configuration in FIG. 4A, the output may suitably be a current or a voltage that indicates the sensed value of the property. As is schematically indicated in FIG. 4A, the sensing signal providing element 31 is coupled a first driving voltage source 33, the sensing element 29, the selection line 13 and the read-out line 15. In response to a selection signal $S_{SEL}$ provided by the selection circuitry 19 on the selection line 13 to which the sensing signal providing element 31 is connected, the sensing signal providing element 31 is configure to provide, to the read-out line 15, a pixel signal $S_{PX}$ being dependent on the above-mentioned output provided by the sensing element 29. The first driving voltage source 33 may, for example, be at a first reference potential $V_1$ of the fingerprint sensing system 3, and may be capable of providing power to the pixel elements 17 of the fingerprint sensing system 3. For example the first reference potential may be +5V, but other potentials are also possible.

Figure 4B:
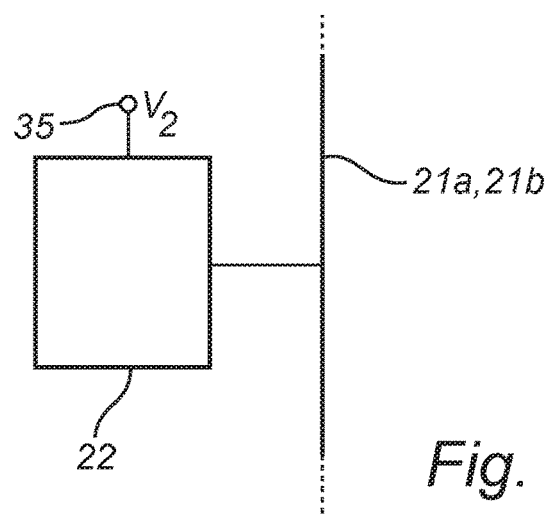
FIG. 4B is a schematic illustration of a reference element comprised in the fingerprint sensing system in FIG. 3.

FIG. 4B is a schematic illustration of a reference element 22 comprised in the fingerprint sensing system 3 in FIG. 3. As is schematically indicated in FIG. 3, each reference element 22 is coupled to a second driving voltage source 35 and to the reference line 21a-b. The second driving voltage source 35 may, for example, be at a second reference potential $V_2$ of the fingerprint sensing system 3. Advantageously, the second reference potential $V_2$ may be equal to the above-mentioned first reference potential V1.

Figure 4C:
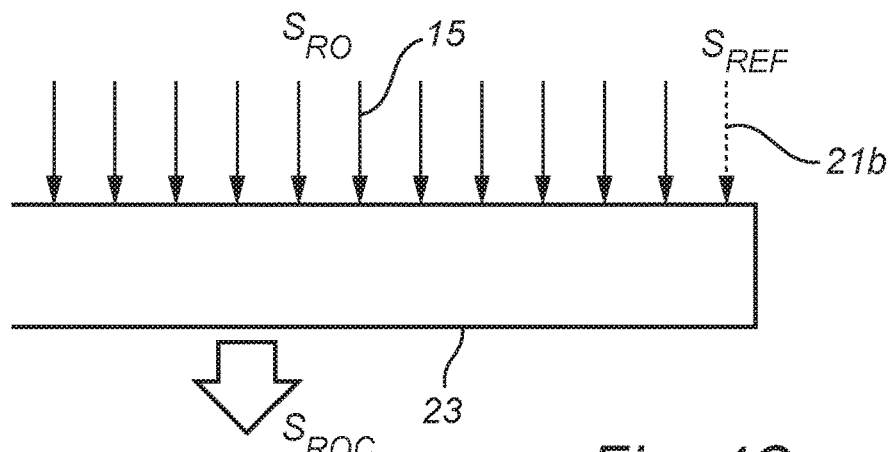
FIG. 4C is a schematic illustration of the read-out circuitry comprised in the fingerprint sensing system in FIG. 3.

FIG. 4C is a schematic illustration of the read-out circuitry 23 comprised in the fingerprint sensing system 3 in FIG. 3. As is schematically indicated in FIG. 4C, the read-out circuitry 23 is coupled to each read-out line 15 (solid lines in FIG. 4C) and to the reference lines 21a-b (only the reference line 21b to the right in FIG. 3 is visible in the enlarged partial view in FIG. 4C, and is indicated as a dashed line). The read-out circuitry 23 is configured to acquire a read-out signal $S_{RO}$ from each of the read-out lines 5, to thereby receive the pixel signals $S_{PX}$ provided by the pixel elements 17 connected to the activated selection line 13. Additionally, the read-out circuitry 23 is configured to acquire a reference signal $S_{REF}$ from the reference lines 21a-b, to form a corrected read-out signal $S_{ROC}$ for the selected pixel element 17 based on the read-out signal $S_{RO}$ and the reference signal $S_{REF}$; and to provide corrected read-out signals $S_{ROC}$ for each pixel element 17 in the plurality of pixel elements, indicated by the block arrow in FIG. 4C.

An example configuration of the fingerprint system 3 in FIG. 3 will now be described in greater detail with reference to FIG. 5, which is an enlarged schematic view of the fingerprint sensing system 3.

Figure 5:
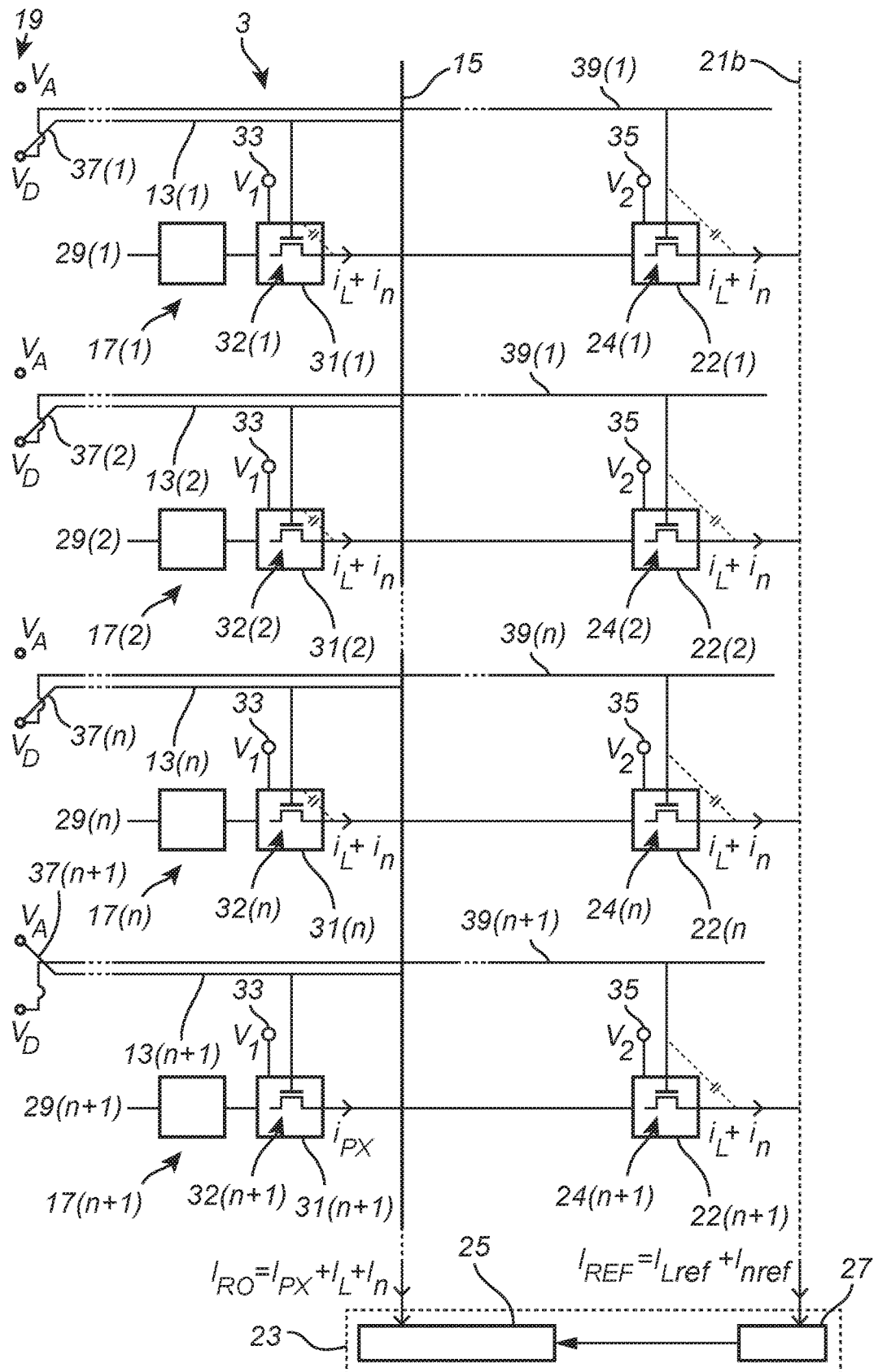
FIG. 5 is an enlarged view of an example configuration of the fingerprint sensing system in FIG. 3.

In FIG. 5, one column of pixel elements and one reference column of reference elements are illustrated for four rows of the sensing array in the fingerprint sensing system 3. The sensing elements will be denoted 17(1), 17(2), 17(n), and 17(n+1), and the corresponding notation will be used for the other parts of the fingerprint sensing system 3 in FIG. 5 where applicable.

In FIG. 5, the selection circuitry 19 is schematically indicated as comprising switches 37(1), 37(2), 37(n), and 37(n+1) for selectively connecting the respective selection lines 13(1), 13(2), 13(n), and 13(n+1) to one of an activation voltage potential $V_A$ and a deactivation voltage potential $V_D$. Furthermore, each sensing signal providing element 31(1), 31(2), 31(n), and 31(n+1) is schematically indicated as comprising respective semiconductor circuitry, here shown as a schematic FET 32(1), 32(2), 32(n), and 32(n+1), with the respective selection line connected to the gate of the FET. In the example configuration of FIG. 5, the pixel elements 17(1), 17(2), 17(n) connected to the selection lines 13(1), 13(2), 13(n) are deactivated (gates of transistors connected to the deactivation voltage potential $V_D$), and the pixel element 17(n+1) connected to the selection line 13(n+1) is activated (gate of transistor connected to the activation voltage potential $V_A$). Accordingly, the sensing signal providing element 31(n+1) of the activated pixel 17(n+1) provides a pixel signal (in this example configuration in the form of a pixel current $I_{PX}$) to the read-out line 15. Each of the deactivated, or deselected, sensing signal elements exhibits a leakage current $i_L$, which is thus provided to the read-out line 15 from each of the deactivated sensing signal elements. In addition, noise that may be present on the selection lines is coupled through the transistors of the deactivated pixel elements through the capacitive coupling between the gate and the drain of each transistor. This capacitively coupled noise contributes with a noise current, denoted $i_n$, provided to the read-out line 15 from each of the deactivated sensing signal elements. Thus, the read-out signal, in this case read-out current $I_{RO}$ received by the read-out circuitry 23 through each read-out line 15 is the sum of the pixel current from the activated pixel element 17(n+1) connected to that read-out line 15, the total leakage current $I_L$, and the total noise current $I_n$ from all of the deactivated pixel elements connected to that read-out line 15.

Like the sensing signal providing element 31(1), 31(2), 31(n), and 31(n+1), each reference element 22(1), 22(2), 22(n), and 22(n+1) is schematically indicated as comprising respective semiconductor circuitry, here shown as a schematic FET 24(1), 24(2), 24(n), and 24(n+1). The gate of each of these FETs is connected to the deactivation voltage potential $V_D$ at the selection circuitry 19 via respective lines 39(1), 39(2), 39(n), and 39(n+1) running in parallel to the corresponding selection lines 13(1), 13(2), 13(n), and 13(n+1). Hereby, substantially the same noise that may be present on the selection lines will also be present on the lines connected to the gates of the transistors 24(1), 24(2), 24(n), and 24(n+1) in the reference elements. In this example configuration, the transistors 24(1), 24(2), 24(n), and 24(n+1) in the reference elements may have identical specs as the transistors 32(1), 32(2), 32(n), and 32(n+1) so that each of the reference elements exhibits a leakage current $i_L$, which is thus provided to the reference line 21b from each of the reference elements. In addition, noise is coupled through the transistors of the reference elements as described above for the deactivated sensing signal providing elements. This capacitively coupled noise contributes with a noise current, denoted $i_n$, provided to the reference line 21b from each of the reference elements. Thus, the reference signal, in this case reference current $I_{REF}$ received by the read-out circuitry 23 through each reference line 21a-b is the total leakage current $I_{L_{ref}}$ and the total noise current $I_{n_{ref}}$ from all of the reference elements connected to that reference line 21a-b.

As is schematically indicated in FIG. 5, the read-out signals $I_{RO}$ carried by the read-out lines 15 are received by a portion 25 of the read-out circuitry 23 that is realized in TFT-technology, while the reference signal(s) IREF carried by the reference line(s) 21a-b is/are received by a portion 27 of the read-out circuitry 23 that is realized in CMOS-technology, such as in an ASIC.

In the example embodiment of FIG. 5, the number of reference elements 22 connected to a reference line 21b has been indicated as being arranged in the same rows as each of the indicated pixel elements 17. It should be noted that this may not necessarily be the case, and that the number of reference elements 22 may be less or greater than the number of pixel elements 17. The skilled person will understand that the reference elements 22 can be dimensioned to, for example, exhibit a leakage current that has substantially the same temperature dependence as the leakage current of a pixel element 17, but is, for example, twice as big. In such an exemplary case, it could be beneficial to provide approximately half the number of reference elements 22 along a reference line 21a-b as there are pixel elements 17 along a read-out line 15. Furthermore, even if each reference element 22 were to exhibit substantially the same leakage current as a pixel element 17, a different number of reference elements 22 could be provided along a reference line 21a-b. In such a case, the difference in the number of elements could be compensated for in the read-out circuitry 23.

Figure 6:
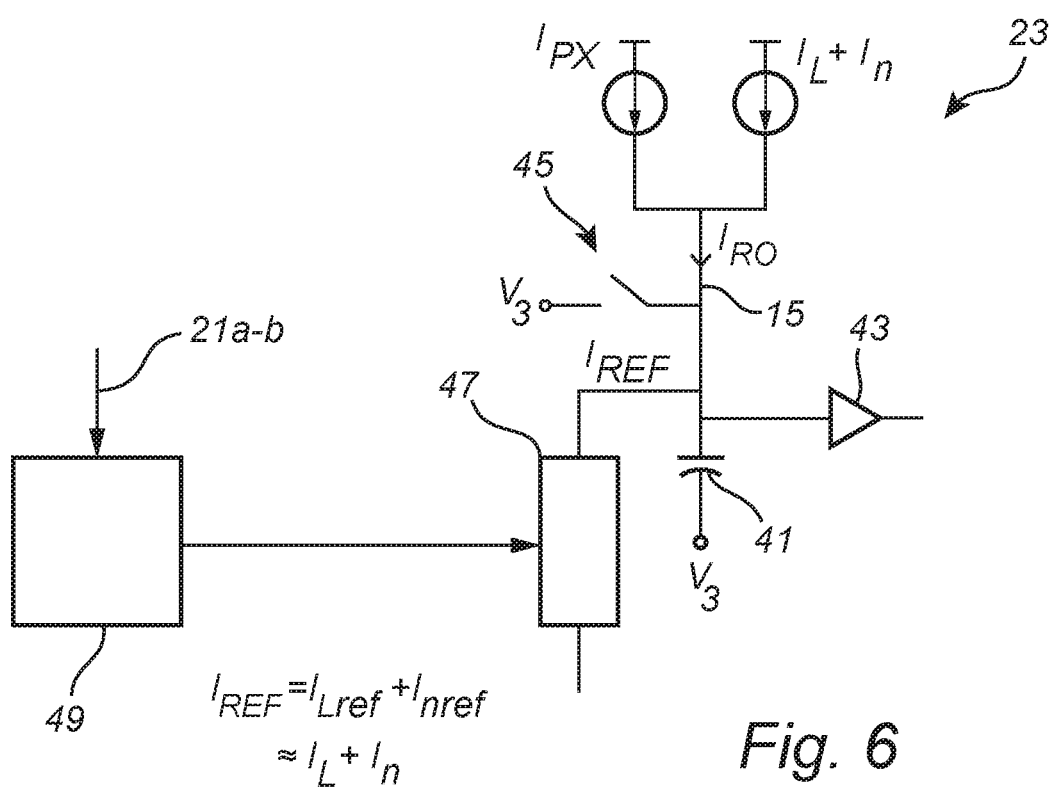
FIG. 6 is an example conceptual configuration of the read-out circuitry comprised in the fingerprint sensing system in FIG. 3.

FIG. 6 is an example conceptual configuration of a portion of the read-out circuitry 23 comprised in the fingerprint sensing system 3 in FIG. 3. Specifically, a portion of the read-out circuitry 23 connected to one read-out line 15 is shown. As is schematically indicated in FIG. 6, the read-out circuitry 23 comprises an integrator 41, here shown as a capacitor, an amplifier 43, a reset switch 45, a controllable shunt 47, and shunt controlling circuitry 49 connected to the reference line(s) 21a-b.

The integrator 41 is connected between a reference potential $V_3$, which may for example be a ground potential or a predefined negative potential, such as −5V, and the read-out line 15 to convert the current provided to the integrator 41 during an integration time to a voltage. The voltage is amplified by the amplifier 43 and output. Following one read-out sequence, the integrator 41 is reset by operation of the read-out switch 45.

As was described above with reference to FIG. 5, the total read-out signal, here current, $I_{RO}$ carried by a read-out line 15 to the read-out circuitry 23 includes a pixel signal component $I_{PX}$ from an activated pixel element 17(n+1) connected to the read-out line 15, and leakage $I_L$ and noise $I_n$ components from the deactivated pixel elements 17(1), 17(2), 17(n) connected to the read-out line 15. In the read-out circuitry 23, the reference signal, here current, $I_{REF}$ is subtracted from the read-out current $I_{RO}$ during the integration time, through control of the controllable shunt 47, to substantially remove the leakage current $I_L$ and the noise current $I_n$ contribution from the deactivated pixel elements. As a consequence, approximately only the pixel signal $I_{PX}$ from the activated pixel element 17(n+1) reaches the integrator 41 and contributes to the voltage that is amplified by the amplifier 43. This initial correction of the read-out signal $I_{RO}$ reduces the risk of saturation of the amplifier 43, and may thereby provide for a considerably increased signal quality from the fingerprint sensing system 3.

Figure 7:
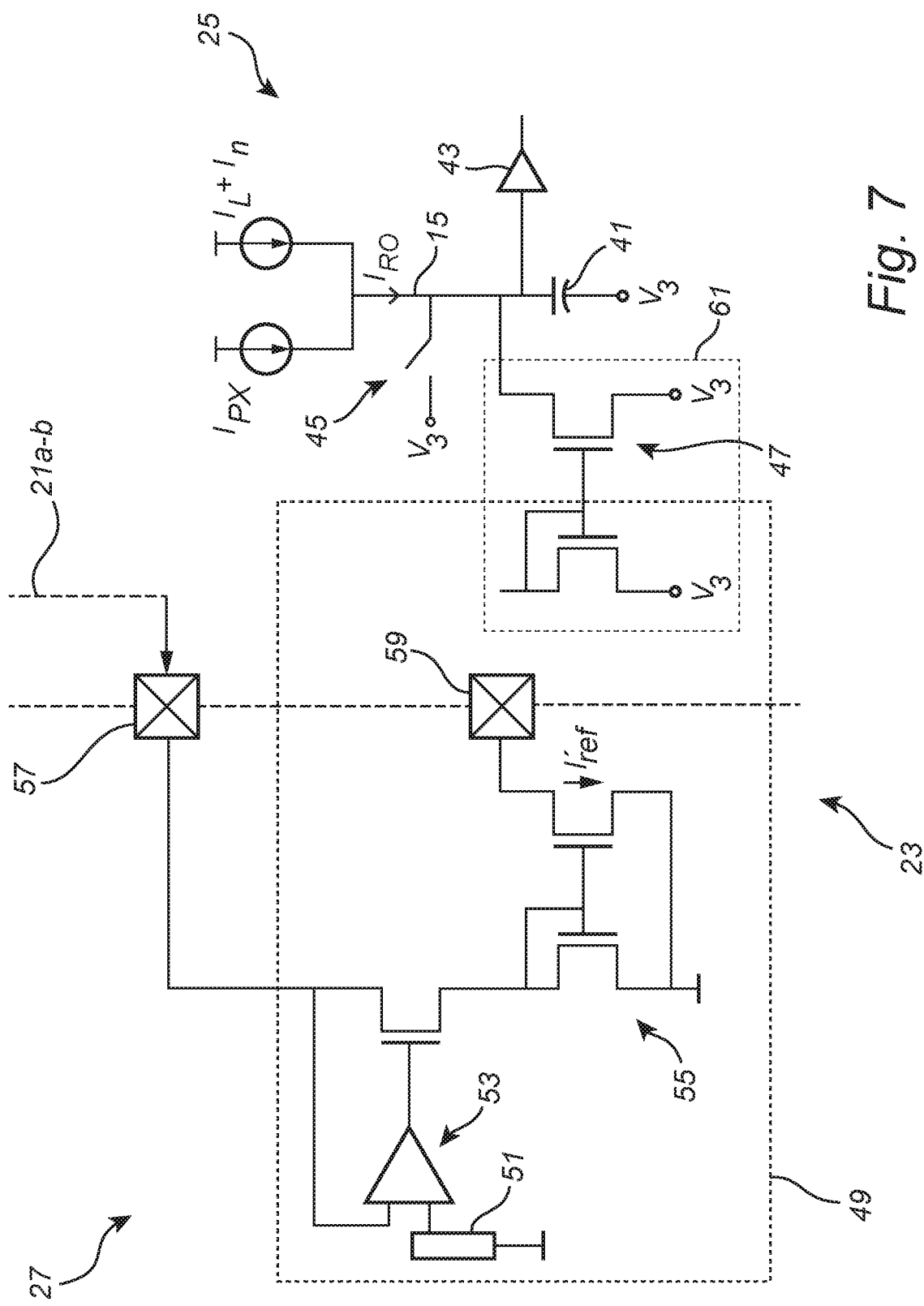
FIG. 7 is an example implementation of the read-out circuitry in FIG. 6.

FIG. 7 is an example implementation of the read-out circuitry in FIG. 6. As described above with reference to FIG. 6, approximately the pixel current $I_{PX}$ is integrated by the integrator 41 during an integration time, and thereby converted to a sensing voltage. Due to the integration, the voltage potential on the read-out line 15 will gradually increase during the integration time. The increasing voltage potential on the read-out line 15 will in turn result in a decreased voltage drop across the deactivated sensing signal providing elements 31(1), 31(2), 31(n), which will result in gradually decreasing leakage current $I_L$ and noise current $I_n$ during the integration time. To improve the correction of the read-out signal $I_{RO}$, the read-out circuitry implementation in FIG. 7 provides a gradually increasing voltage potential to the reference line(s) 21a-b also, for the behavior of the reference current $I_{REF}$ to mimic the behavior over time of the read-out current $I_{RO}$.

In the example implementation of the read-out circuitry 23 in FIG. 7, the generation of the gradually increasing voltage potential to the reference line(s) 21a-b and the sensing of the resulting reference current $I_{REF}$ is carried out by the ASIC part 27 of the read-out circuitry. As is schematically shown in FIG. 7, the ASIC part 27 comprises a voltage ramp generator 51, a voltage follower 53, and a current mirror 55. The ASIC part 27 further has an input connected to a first pad 57 on the TFT part 25 and an output connected to a second pad 59 on the TFT part 25.

In the TFT part 25, the reference line 21a-b is connected to the first pad 57, and a functional part of the above-mentioned shunt controlling circuitry 49 is connected to the second pad 59.

In operation, the voltage ramp generator 51 provides a voltage ramp to the input of the voltage follower 53. The voltage ramp generator 51 is controlled to provide a voltage ramp that mimics the (average) voltage build-up on the read-out line 15 caused by the integrator 41. The voltage follower 53 provides the voltage ramp to the reference line 21a-b via the first pad 57, and the reference current $I_{REF}$ is received by the ASIC part 27 of the read-out circuitry 23 via the first pad 57. The reference current $I_{REF}$ is provided to the current mirror 55, and from the current mirror to the TFT part 25 of the read-out circuitry 23 via the second pad 59. In the TFT part 25, the reference current $I_{REF}$ is provided to a current mirror 61, which is partly formed by the above-mentioned controllable shunt 47.

A fingerprint sensing system 3 according to a second example embodiment of the present invention will now be described with reference to FIG. 8. This second example embodiment mainly differs from the first example embodiment described above with reference to FIG. 3 in that the fingerprint sensing system 3 is an optical fingerprint system, in which it is expected that the dark current from the selected pixel element will contribute significantly to a disturbance signal component on the read-out line connected to the selected pixel element.

For some use cases or fingerprint sensing system configurations, the dark current contribution to the disturbance signal component may be dominant to the degree that it may not be necessary to correct for the leakage and noise as described above for the first example embodiment. The following description of the second example embodiment assumes such a use case or fingerprint sensing system configuration, and focusses solely on correction for the disturbance caused by the dark current of the selected pixel element 17.

It should, however, be noted that the first and second embodiments may be combined, to allow for correction in the read-out circuitry 23 in respect of both leakage current and dark current.

Figure 8:
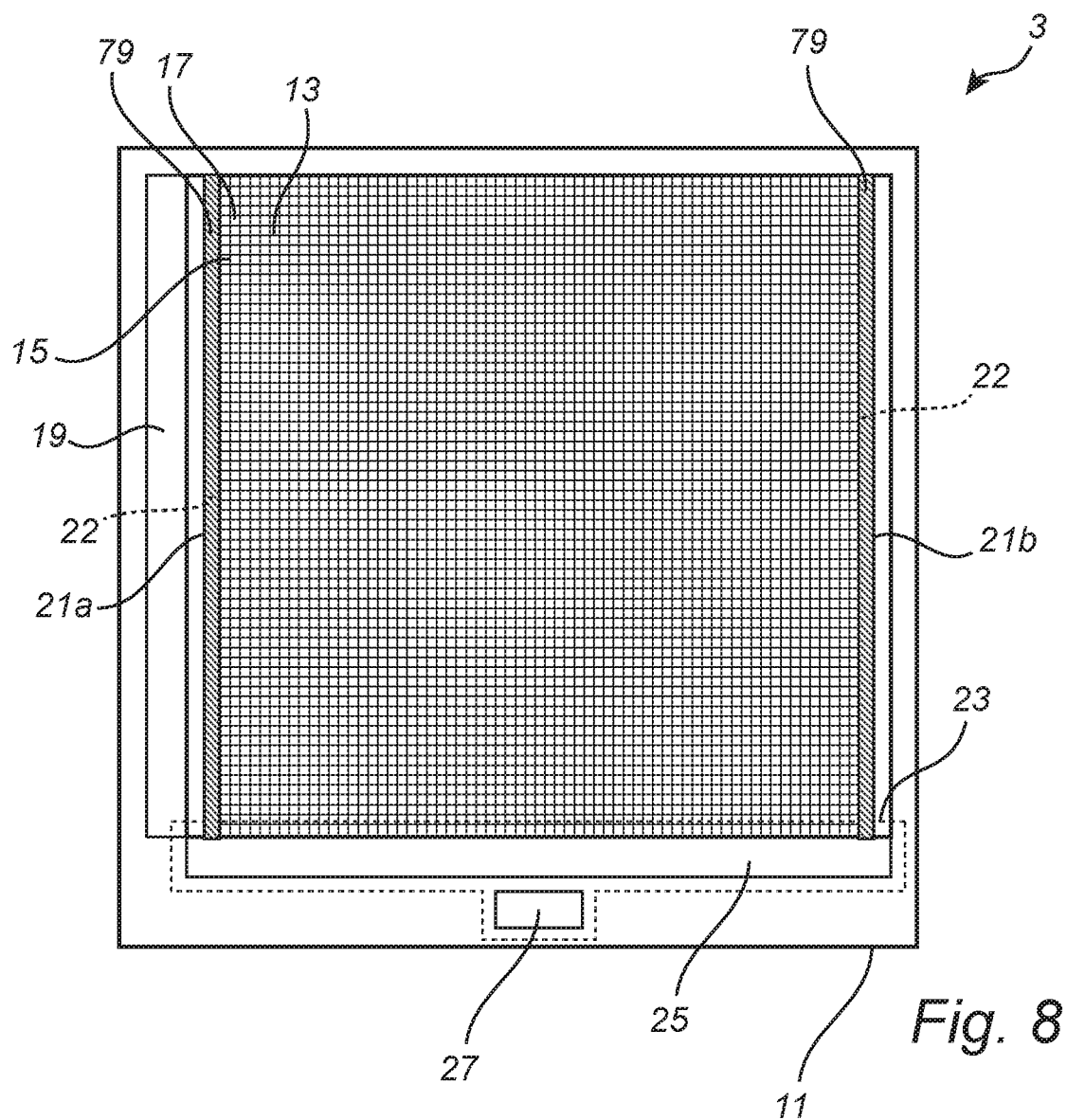
FIG. 8 schematically illustrates a fingerprint sensing system according to a second example embodiment of the present invention.

As in the first example embodiment described above with reference to FIG. 3, the fingerprint sensing system 3 in FIG. 8 may have at least one reference line 21*a-b*, which may be arranged in parallel to the read-out lines 15, although this may not necessarily be the case. In the example configuration in FIG. 8, a plurality of reference elements 22 are connected to each of the reference lines 21*a-b*, where each reference element 22 comprises a reference sensing element responsive to an amount of light incident on the reference sensing element to provide an output indicating a sensed value of the amount of light, and a reference signal providing element coupled to the reference sensing element and the read-out circuitry, the sensing signal providing element being configured to provide to the read-out circuitry 23 a reference sensing signal being dependent on the output provided by the reference sensing element. Furthermore, as is schematically indicated in FIG. 8, the fingerprint sensing system 3 comprises an opaque shielding structure, here in the form of metal pattern 79, arranged to prevent light from reaching the reference sensing elements of the reference elements 22.

It should be noted that a single reference element 22 may be sufficient for achieving an acceptable level of correction in this second example embodiment.

Figure 9:
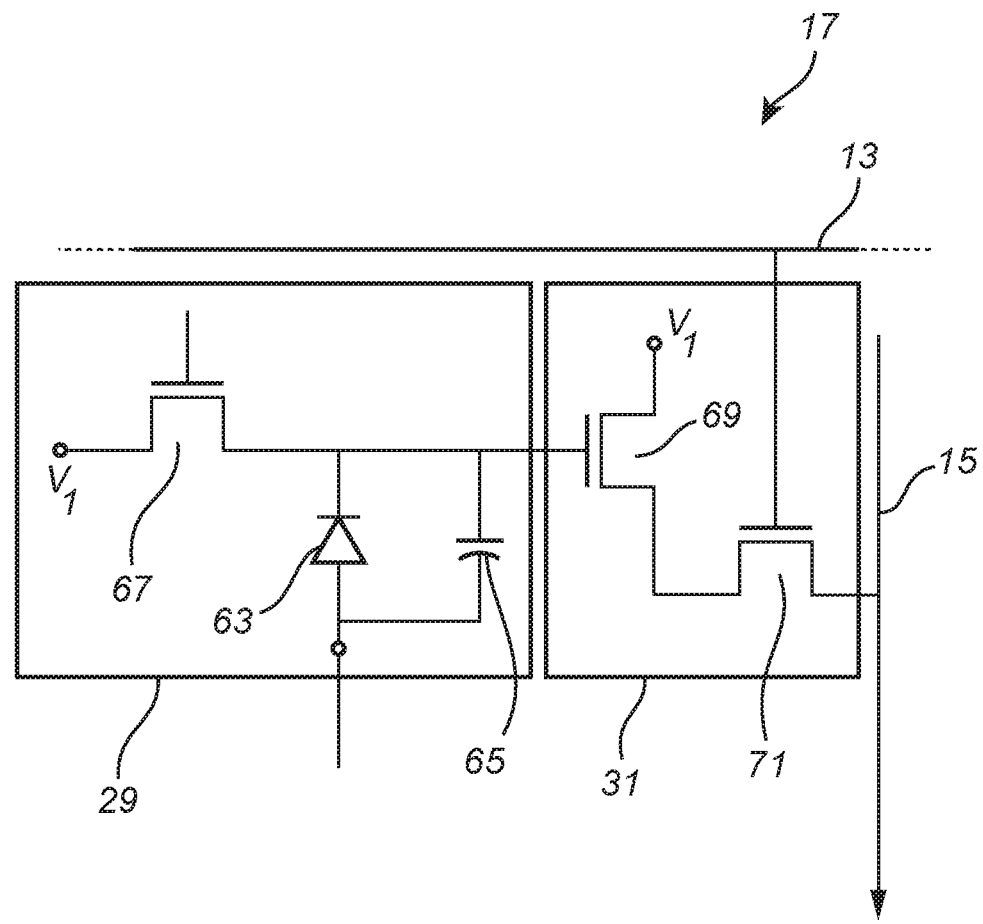
FIG. 9 schematically shows an example of a pixel element comprised in the fingerprint sensing system according to embodiments of the present invention, in the form of an optical pixel element.

FIG. 9 schematically shows a concrete example of a pixel element 17 that may be comprised in the fingerprint sensing system 3 according to the second embodiment in FIG. 8, in the form of an optical pixel element. It should be noted that the pixel element 17 in FIG. 9 may also be included in the fingerprint sensing system 3 according to the first example embodiment described with reference to FIGS. 1 to 7.

In the exemplary optical pixel element 17 in FIG. 9, the sensing element 29 comprises a photo-diode 63, a pixel integrator 65, and a reset switch 67. The sensing signal providing circuitry 31 comprises an example configuration of the above-mentioned semiconductor circuitry 32, in the form of a controllable current source 69 and a selection switch 71.

In operation, light incident on the photo-diode 63 results in a photo-current, which is provided to the pixel integrator 65 during an integration time to convert the accumulated photo-current to a voltage indicative of the amount of light incident on the photo-diode 63 during the integration time. This accumulated photo-current (and thus the voltage on the pixel integrator 65) is, at least to some degree, indicative of the distance between the photo-diode 63 and the finger surface.

The voltage output of the sensing element 29 controls the controllable current source 69 in the sensing signal providing element 31 to generate a sensing current, which is provided to the read-out line 15 if the selection switch 71 is operated by a selection signal on the selection line 13. After a read-out event, the pixel element 17 is reset by providing a reset signal to the reset switch 67.

In the second example embodiment of the fingerprint sensing system 3, the reference element(s) 22 may advantageously have the same or similar configuration as the pixel element 17 in FIG. 9. In one configuration, one reference element 22 may be connected to each selection line 13 and a reference line 21*a-b* in analogy to one pixel element 17 being connected to each reference line 13 and a read-out line 15. In another configuration, the reference element 22 (or reference elements) may not be connected to a selection line 13, but may be configured to always be selected.

Figure 10:
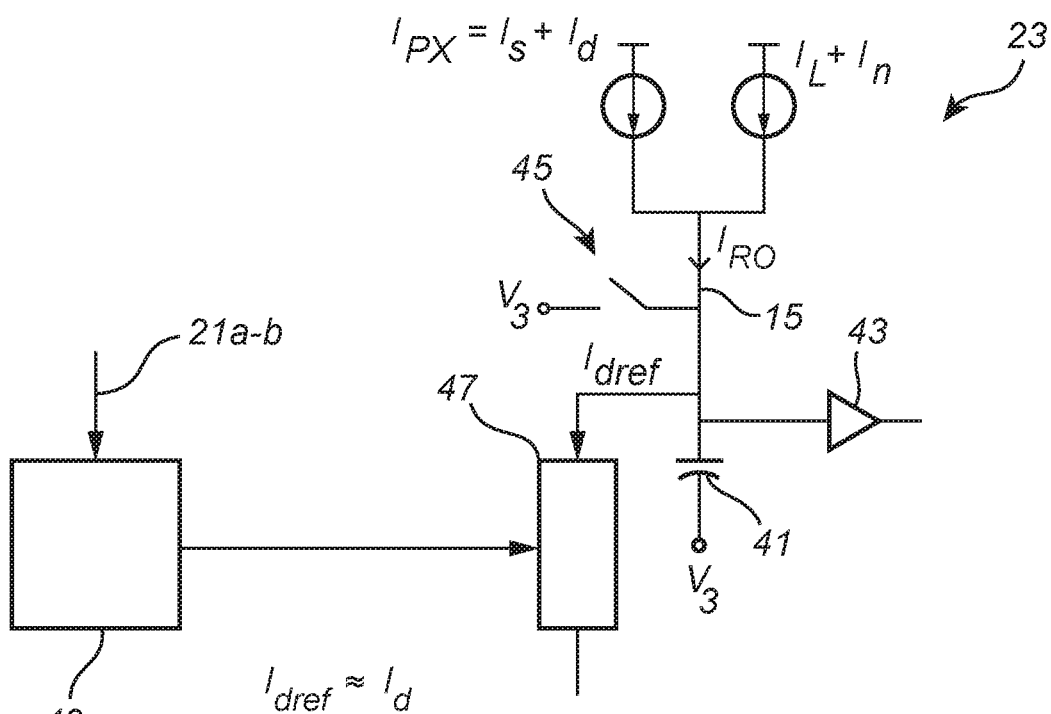
FIG. 10 is an example conceptual configuration of the read-out circuitry comprised in the fingerprint sensing system in FIG. 8.

FIG. 10 is an example conceptual configuration of a portion of the read-out circuitry 23 comprised in the fingerprint sensing system 3 in FIG. 8. The read-out circuitry 23 in FIG. 10 may have substantially the same configuration as the read-out circuitry 23 described above with reference to FIG. 6.

In this case, however, the unwanted common mode portion of the readout signal, here current $I_{RO}$, is dominated by the so-called dark current $I_d$ from the selected pixel. Accordingly, as is also indicated in FIG. 10, the pixel signal component $I_{PX}$ includes the sensing signal $I_s$ and the dark current signal component $I_d$, and the dark current signal component $I_d$ is substantially larger than the leakage $I_L$ and noise $I_n$ components from the deactivated pixel elements connected to the read-out line 15. Therefore, these components are disregarded in this particular example configuration.

Since each of the reference lines 21*a-b* in the fingerprint sensing system 3 in FIG. 8 is connected to at least one reference element 22 producing a reference dark current signal $I_{dref}$, the reference signal, here current, $I_{REF}$ is subtracted from the read-out current $I_{RO}$, through control of the controllable shunt 47, to substantially remove the dark current $I_d$. As a consequence, approximately only the sensing signal $I_s$ from the activated pixel element (in this configuration it has been assumed that the leakage current $I_L$ and the noise current $I_n$ are negligible) reaches the integrator 41 and contributes to the voltage that is amplified by the amplifier 43. This initial correction of the read-out signal $I_{RO}$ reduces the risk of saturation of the amplifier 43, and may thereby provide for a considerably increased signal quality from the fingerprint sensing system 3.

A fingerprint sensing system 3 according to a third example embodiment of the present invention will now be described with reference to FIG. 11. This third example embodiment mainly differs from the first and second example embodiments described above in that reference signal source does not include any reference lines and reference elements. In this third example embodiment, it can be said that no assumptions concerning causes of disturbing common mode signals need to be made, and that no additional structures in the TFT-matrix may be required.

Figure 11:
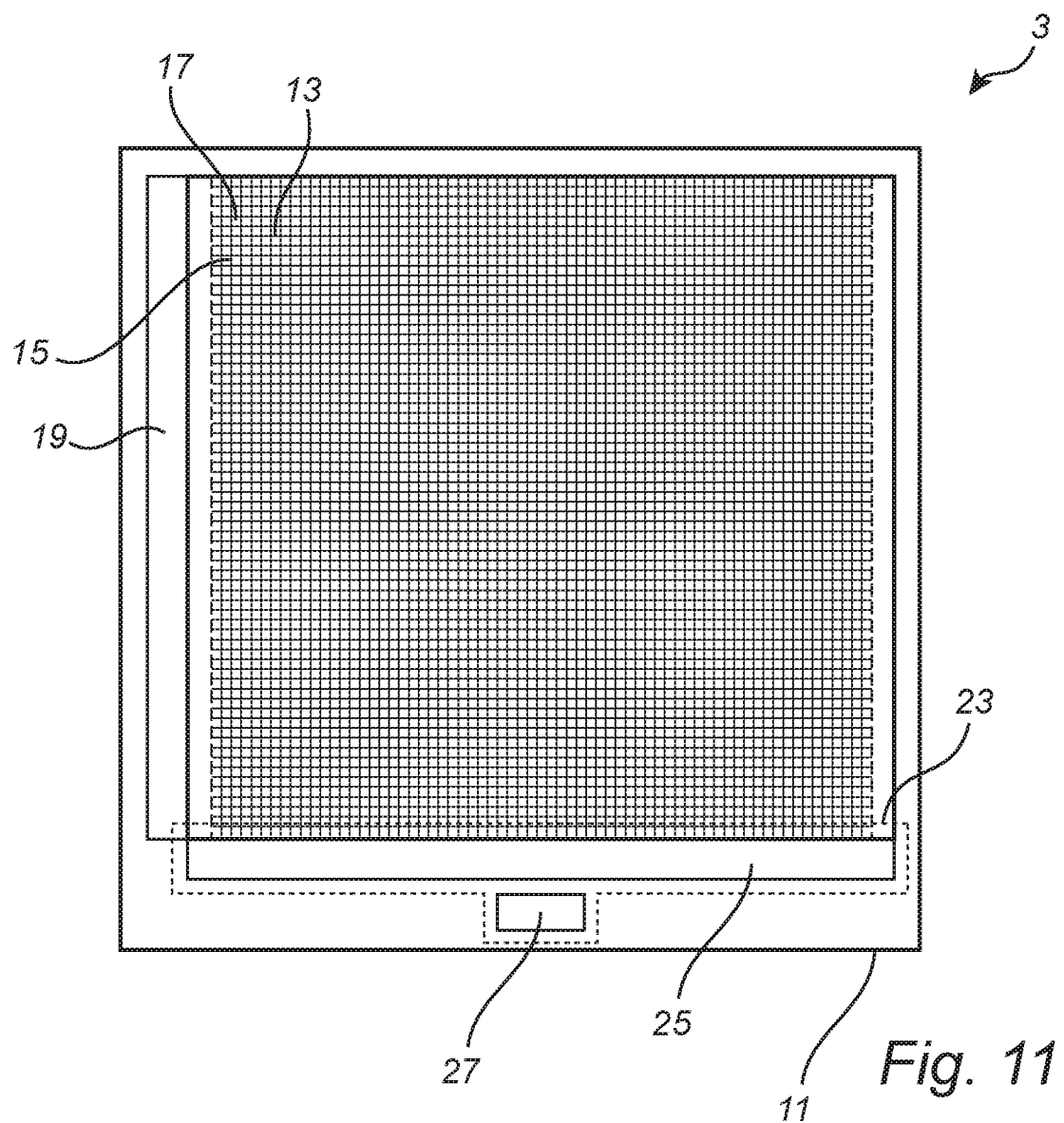
FIG. 11 schematically illustrates a fingerprint sensing system according to a third example embodiment of the present invention.

In the third example embodiment of FIG. 11, the reference signal source is instead included in the read-out circuitry 23. An example configuration of such read-out circuitry 23 including the reference signal source will now be described with reference to FIG. 12.

Figure 12:
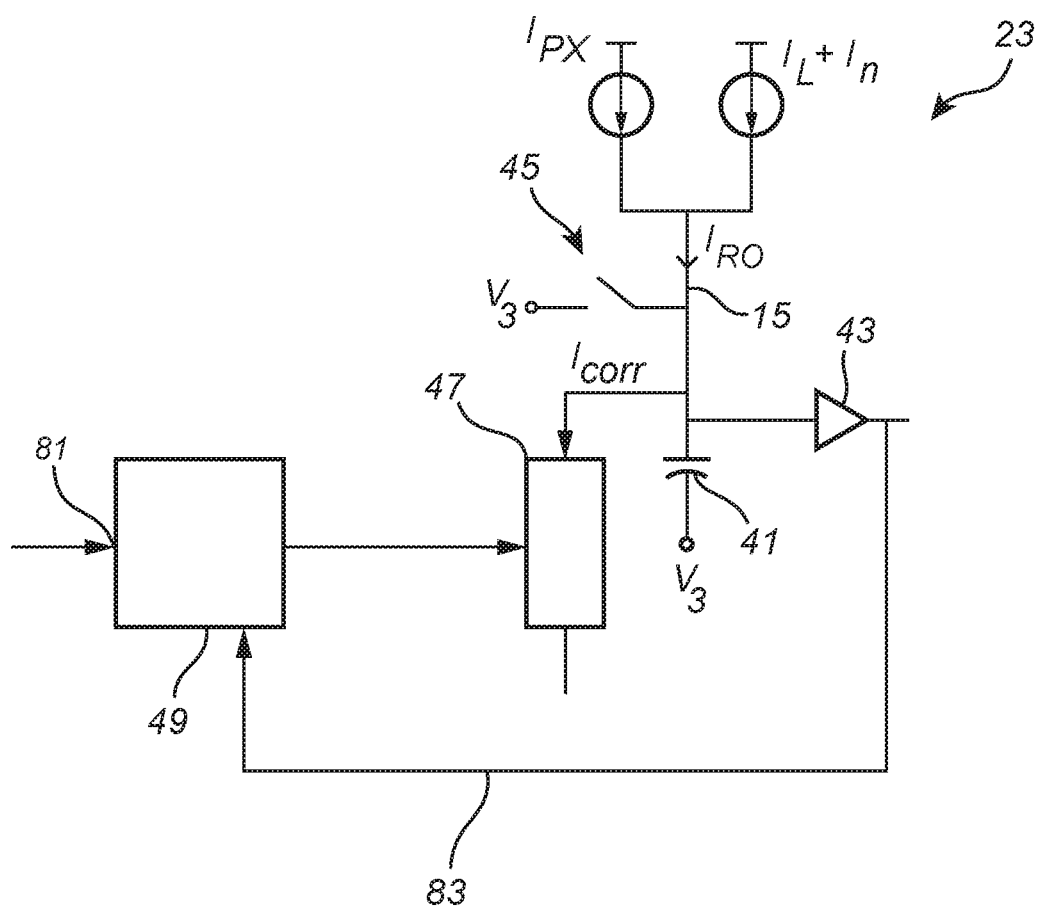
FIG. 12 is an example conceptual configuration of the read-out circuitry comprised in the fingerprint sensing system in FIG. 11.

FIG. 12 is an example conceptual configuration of a portion of the read-out circuitry 23 comprised in the fingerprint sensing system 3 in FIG. 11. The read-out circuitry 23 in FIG. 12 mainly differs from the configurations described above with reference to FIG. 6 and FIG. 10 in that the shunt controlling circuitry 49 is not connected to any reference lines, but independently acts as reference signal source.

In embodiments, the shunt controlling circuitry 49 may have an input 81 for receiving a signal indicative of present operating conditions of the fingerprint sensing system 3, such as a signal indicative of the operating temperature. In such embodiments, the shunt controlling circuitry 49 may be configured to generate a predefined control signal depending on the present operating conditions, causing the controllable shunt 47 to shunt a correction current $I_{corr}$ past the integrator 41, during an integration time. Optionally, the corrected readout signal output by the amplifier 43 may be feed-back coupled, through a feedback coupling 83, to the shunt controlling circuitry 49 and used to modify the control signal from the shunt controlling circuitry 49 to the controllable shunt 47.

In other embodiments, the shunt controlling circuitry 49 may be configured to generate an initial control signal independently of the operating conditions, and then modify the control signal from this initial control signal depending on the feedback received through the feedback coupling 83.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A fingerprint sensing system for sensing a finger surface of a finger, comprising:
    a plurality of conductive selection lines arranged in parallel to each other;
    a plurality of conductive read-out lines arranged in parallel to each other and crossing the plurality of conductive selection lines;
    selection circuitry coupled to each conductive selection line in the plurality of conductive selection lines, and controllable to provide a selection signal on at least one selected conductive selection line in the plurality of conductive selection lines;
    a plurality of pixel elements, each being formed at a respective intersection between a conductive selection line in the plurality of conductive selection lines and a conductive read-out line in the plurality of conductive read-out lines, each pixel element in the plurality of pixel elements comprising:
        a sensing element responsive to a property indicative of a distance between the sensing element and the finger surface to provide an output indicating a sensed value of the property; and
        a sensing signal providing element coupled to the sensing element, the conductive selection line and the conductive read-out line, the sensing signal providing element being configured to provide to the conductive read-out line, in response to the selection signal being provided on the conductive selection line, a sensing signal being dependent on the output provided by the sensing element;
    a reference signal source configured to provide a reference signal; and
    read-out circuitry coupled to each conductive read-out line in the plurality of conductive read-out lines and to the reference signal source, the read-out circuitry being configured to:
        acquire a read-out signal via a conductive read-out line connected to a selected pixel element, when the selected pixel element provides the sensing signal;
        acquire the reference signal from the reference signal source;
        form a corrected read-out signal for the selected pixel element based on the read-out signal and the reference signal; and
        provide corrected read-out signals for each pixel element in the plurality of pixel elements, wherein the fingerprint sensing system comprises:
            a TFT module including at least the plurality of conductive selection lines, the plurality of conductive read-out lines, and the pixel elements; and
            an ASIC coupled to the TFT-module, the ASIC including at least a portion of the read-out circuitry.

2. The fingerprint sensing system according to claim 1, wherein the reference signal source is at least partly included in the ASIC.

3. The fingerprint sensing system according to claim 1, wherein the reference signal source is at least partly included in the TFT-module.

4. The fingerprint sensing system according to claim 3, wherein:
    the fingerprint sensing system further comprises a conductive reference line;
    the read-out circuitry is coupled to the reference signal source via the conductive reference line; and
    the conductive reference line is included in the TFT-module.

5. The fingerprint sensing system according to claim 4, wherein the conductive reference line is arranged in parallel with the plurality of conductive read-out lines.

6. The fingerprint sensing system according to claim 1, wherein the reference signal source includes at least one reference element included in the TFT-module.

7. The fingerprint sensing system according to claim 6, wherein:
    the sensing signal providing element comprised in each pixel element in the plurality of pixel elements includes semiconductor circuitry exhibiting a leakage current with a first temperature dependence, in the absence of the selection signal on the conductive selection line coupled to the sensing signal providing element; and
    the at least one reference element includes semiconductor circuitry exhibiting a leakage current with a second temperature dependence.

8. The fingerprint sensing system according to claim 7, wherein the semiconductor circuitry comprised in the sensing signal providing element in each pixel element, and the semiconductor circuitry comprised in the at least one reference element are formed using the same materials and the same processing steps.

9. The fingerprint sensing system according to claim 1, wherein:
    the sensing element comprised in each pixel element in the plurality of pixel elements is responsive to an amount of light incident on the sensing element to provide an output indicating a sensed value of the amount of light;
    the at least one reference element comprises:
        a reference sensing element responsive to an amount of light incident on the reference sensing element to provide an output indicating a sensed value of the amount of light; and
        a reference signal providing element coupled to the reference sensing element and the read-out circuitry, the reference signal providing element being configured to provide to the read-out circuitry a reference sensing signal being dependent on the output provided by the reference sensing element; and
    the fingerprint sensing system further comprises an opaque shielding structure arranged to prevent light from reaching the reference sensing element of the at least one reference element.

10. The fingerprint sensing system according to claim 1, wherein:

the sensing signal providing element comprised in each pixel element in the plurality of pixel elements is additionally coupled to a first driving voltage source; and the fingerprint sensing system comprises a plurality of reference elements, each reference element in the plurality of reference elements being coupled to a second driving voltage source and to the read-out circuitry.

11. The fingerprint sensing system according to claim 10, wherein:

the sensing signal providing element comprised in each pixel element in the plurality of pixel elements includes a transistor with a source connected to the first driving voltage source, a drain connected to the conductive read-out line, and a gate connected to the sensing element; and each reference element in the plurality of reference elements comprises a transistor with a source connected to the second driving voltage source, a drain connected to the conductive reference line, and a gate connected to a reference potential.

12. The fingerprint sensing system according to claim 1, wherein:

the fingerprint sensing system comprises a conductive reference line;

the read-out circuitry is coupled to the reference signal source via the conductive reference line;

the sensing signal providing element comprised in each pixel element in the plurality of pixel elements is configured to provide the sensing signal in the form of a sensing current; and the read-out circuitry is configured to:
receive a read-out current on the conductive read-out line connected to the selected pixel element;
receive a reference current on the conductive reference line; and
subtract the reference current from the read-out current, resulting in a corrected read-out current.

13. The fingerprint sensing system according to claim 12, wherein the read-out circuitry comprises integration circuitry configured to receive the corrected read-out current, and to convert the corrected read-out current received during an integration time to a read-out voltage.

14. The fingerprint sensing system according to claim 13, wherein the fingerprint sensing system further comprises correction circuitry connected to the conductive reference line and configured to provide a time-varying potential to the conductive reference line at an interface between the conductive reference line and the read-out circuitry.

15. The fingerprint sensing system according to claim 14, wherein the correction circuitry is configured to provide the time-varying potential to the conductive reference line as a potential that increases monotonically during the integration time.

16. An electronic device, comprising:
the fingerprint sensing system according to claim 1; and processing circuitry coupled to the fingerprint sensing system, and configured to perform an authentication based on the corrected read-out signals provided by the read-out circuitry of the fingerprint sensing system.

* * * * *